United States Patent [19]
Greenblatt

[11] Patent Number: 5,917,853
[45] Date of Patent: Jun. 29, 1999

[54] METHOD OF AND APPARATUS FOR TRAINING HIGH SPEED DIGITAL TELEPHONIC MODEMS TO OBVIATE IMPERFECTIONS IN THE TELEPHONE CHANNEL, WHILE SIMULTANEOUSLY ALLOWING CONVERSATION

[75] Inventor: Richard David Greenblatt, Belmont, Mass.

[73] Assignee: Academy of Applied Science, Concord, N.H.

[21] Appl. No.: 08/269,815

[22] Filed: Jun. 30, 1994

[51] Int. Cl.⁶ .................................. H04B 1/38; H04L 5/16
[52] U.S. Cl. ...................... 375/222; 375/377; 379/93.29; 379/93.09
[58] Field of Search .................... 371/2.1, 3; 375/231, 375/369, 295, 219, 285, 346, 377, 240, 296, 363, 222; 381/29, 33, 34, 35; 370/588, 525; 379/93, 98, 406, 93.31, 408, 93.32, 410, 93.29, 93.09

[56] References Cited

U.S. PATENT DOCUMENTS

| | | | |
|---|---|---|---|
| 4,377,860 | 3/1983 | Godbole | 370/84 |
| 4,425,661 | 1/1984 | Moses et al. | 375/200 |
| 4,479,213 | 10/1984 | Galand et al. | 370/118 |
| 4,519,073 | 5/1985 | Bertocci et al. | 370/118 |
| 4,697,264 | 9/1987 | Galensky et al. | 370/111 |
| 4,752,940 | 6/1988 | Graham | 375/10 |
| 4,813,040 | 3/1989 | Futato | 370/111 |
| 4,903,262 | 2/1990 | Dissosway et al. | 370/95.2 |
| 4,905,282 | 2/1990 | McGlynn et al. | 375/231 |
| 4,908,851 | 3/1990 | Kortani et al. | 379/96 X |
| 4,980,767 | 12/1990 | Chao et al. | 375/231 |
| 5,136,586 | 8/1992 | Greenblatt | 370/110.4 |
| 5,146,472 | 9/1992 | Hallman | 375/231 |
| 5,260,972 | 11/1993 | Wang | 375/231 |
| 5,303,226 | 4/1994 | Okanoue et al. | 370/17 |
| 5,412,566 | 5/1995 | Sawa | 364/419.24 |
| 5,425,076 | 6/1995 | Knippelmier | 379/27 |
| 5,517,533 | 5/1996 | Szmauz et al. | 375/354 |

*Primary Examiner*—Chi H. Pham
*Assistant Examiner*—Bryan Webster
*Attorney, Agent, or Firm*—Rines and Rines

[57] ABSTRACT

A method and apparatus for "training" high speed telephonic modems to adjust or become corrected to obviate imperfections in the telephone channel or line, such as echoes, phase changes and other effects, while concurrently with voice communication on such simple telephone lines through sending test signals in unoccupied spaces of successive time frames created by compressing concurrent digital voice therein.

14 Claims, 9 Drawing Sheets

SIGNAL MODEL (AS SEEN FROM STATION A)

FIG. 3

TAPPED DELAY LINE REALIZATION OF TRANSFER FUNCTION

METHOD OF AND APPARATUS FOR TRAINING HIGH SPEED DIGITAL TELEPHONIC MODEMS TO OBVIATE IMPERFECTIONS IN THE TELEPHONE CHANNEL, WHILE SIMULTANEOUSLY ALLOWING CONVERSATION

The present invention relates generally to the concurrent transmission and reception of voice over a telephone channel or system, being more particularly directed to enabling voice conversation while concurrently "training" high speed digital telephonic modems used with such channel or system to become appropriately adjusted to obviate imperfections in the telephone channel such as echoes, phase changes and other effects—and to do so over a single telephone channel or line with transparency or imperceptibility to the telephone users.

This invention was made with government support under grant 5 R44 RR07527-03 awarded by the PHS. The government has certain rights in the invention.

BACKGROUND

Modem technologies to transmit digital data over the Public Switched Telephone Network (PSTN) have made rapid advances in recent years. The latest such technologies, such as the CCITT V.32, V.32bis specifications and ITU [successor organization to the CCITT] V.34 (which was known during its gestation phase as V.FAST) specification require a "training" interval during the initial connection phase of operation before communication can begin, to test and responsively compensate for imperfections in the telephone channel or line performance. If audio monitoring of the telephone line is turned on, the user of a modern digital computer modem placing a call can often hear the training phase as a "feep-foop" sound followed by a "rushing water" sound just after the remote modem answers.

This training interval may last from 3 to 10 or more seconds in various circumstances. With conventional methods, no transfer of information, particularly including voice conversation, is possible during the training interval. In accordance with the present invention, on the other hand, ordinary conversation can proceed while the training is simultaneously occurring. Once training has been completed, the operation can switch to a purely digital mode, by which means the audio conversation may continue while simultaneously also transferring other digital data. Such operation is greatly facilitated by modern audio coding techniques, which significantly reduce the amount of digital data which must be transferred for a given perceived speech fidelity.

The importance of the present invention may be more fully appreciated when one considers the possibility of an advanced PSTN instrument having the ability to transmit both voice and data and operating in an underlying purely digital mode. Such an instrument, however, could be objectionable to ordinary telephone users for ordinary calls because of the frustrating training delay required just after a call is answered. Improving the instrument by incorporating the present invention, however, possibly taking advantage of techniques disclosed in my prior U.S. Pat. Nos. 5,036,513 and 5,136,586, results in functionality transparent or imperceptible to the user as compared to an ordinary telephone; i.e., conversation can begin immediately as soon as the phone is answered. It can be expected that the delay between initiation of the call and full digital operation will be somewhat longer with the current invention as compared to present methods wherein the line is fully dedicated to training for a period of time; however, this represents attractive tradeoff from the point of view of any ordinary telephone user who is not required to change his habits.

In this patent, a method and system are disclosed proprietarily referred to as "Omniphone"™, for telephone line multiplex channeling of toll-quality voice and modem-encoded digital data from telecommunication devices (FAX, computers, displays, printers, etc.). During the connection phase as specified by this method, voice signals are divided into successive time frames each of which is time compressed by a certain percentage; and, in accordance with the present invention, filling the resulting unoccupied time within each such frame with test signals instead of telecommunication device data as per U.S. Pat. No. 5,136,586. On receipt of these test signals (which may include silence) the receiving station may deduce properties of the particular telephone channel which has been obtained. Thus, by means of the present invention, training for the digital mode is also occurring as well as supporting the user conversation; and when sufficient information about the channel has been obtained, the training is said to be completed and operation may switch to a purely digital mode. Throughout this entire process, the user's conversation continues unaffected. After the switchover, arbitrary digital information, such as text strings, faxes, computer data, or pictures and the like may be transferred, consistent with the speed of the digital modem technology, the audio coding technology employed, etc.

The technique of my earlier U.S. Pat. No. 5,036,513 can also be important insofar as it enables seamless operation with ordinary phones (achieving only ordinary telephone functionality in that mode, of course). In accordance with that technique, there is provided a novel method of and apparatus for voice communication and transparent, non-interfering, automatic digital data exchange between appropriately equipped telephone terminals having cooperative digital signal processing and visual display equipment, Using special recognition signal protocol triggering signals and providing modem capability for FAX, printer, microprocessor, answer machines and the like for providing extended services using in-band signaling sensible by users and machines. Such method is useful both with ordinary telephone exchanges and ISDN type exchanges.

The term "training" as applied to high speed digital modems and as before briefly mentioned, means determining the transfer function of the particular telephone channel or line which has been obtained (in the most interesting case, over the PSTN), so that a compensator may operate to neutralize the effect of these imperfections. These imperfections may include phase changes, reflections (echoes), delays, and frequency emphasis or de-emphasis, among other things.

To ascertain these imperfections, present day international standard modem technologies, such as the before-referenced V.32, V.32bis and V.34, specify a training interval during which certain known test signals are transmitted and the received signal analyzed. During the period these test signals are exchanged, however, no other information (particularly no voice communication) can flow over the connection—the problem which the present invention seeks to alleviate or obviate. The net effect, then, is to achieve a "train-while-talk" capability.

OBJECTS OF THE INVENTION

A primary object of the invention, accordingly, is to provide a new and improved method of and apparatus for enabling the training of high speed digital telephonic modems ("train-while-talk") to obviate imperfections in the telephone channel or line, while simultaneously allowing conversation along the channel.

A further object is to provide such a novel technique, using the features of one or both of my before-mentioned earlier U.S. Pat. Nos. 5,136,586 and 5,036,513.

Other and further objects will be explained herein-after and are more particularly delineated in the appended claims.

SUMMARY

In summary, from one of its viewpoints, the invention embraces a method by which high speed modems can be trained, while simultaneously permitting audio conversation over a channel. More specifically, the invention embraces a method of training high speed digital telephonic modems, operating with telephone transmitting and receiving instruments over a telephone channel, to become appropriately adjusted to obviate imperfections, such as echoes and other distortions, and to do so concurrently with uninterrupted voice communication over the telephone channel, said method comprising, compressing digitally converted voice signals emanating at the instruments within successive time frames thereby creating an unoccupied time interval within each such frame; introducing into said unoccupied times, within each time frame, digital data corresponding to information tending to assess the nature of the imperfections and intended for training the modems to adjust for such imperfections; and adjusting the modems in response to and in accordance with said digital data to correct for the imperfections in the telephone channel and during uninterrupted voice communication thereover.

Preferred and best mode implementations and embodiments are later presented.

DRAWINGS

The invention will now be described with reference to the accompanying drawings, FIG. 1 of which is block circuit diagram illustrating the operation of the standard Public Switched Telephone Network (PTSN) in which live imperfections, illustrated in the form of echoes, are generated, and in which the invention is incorporated in preferred form to enable the system to be trained to compensate for such echoes or otherwise obviate the same.

DESCRIPTION OF PREFERRED EMBODIMENTS

Figure 1:
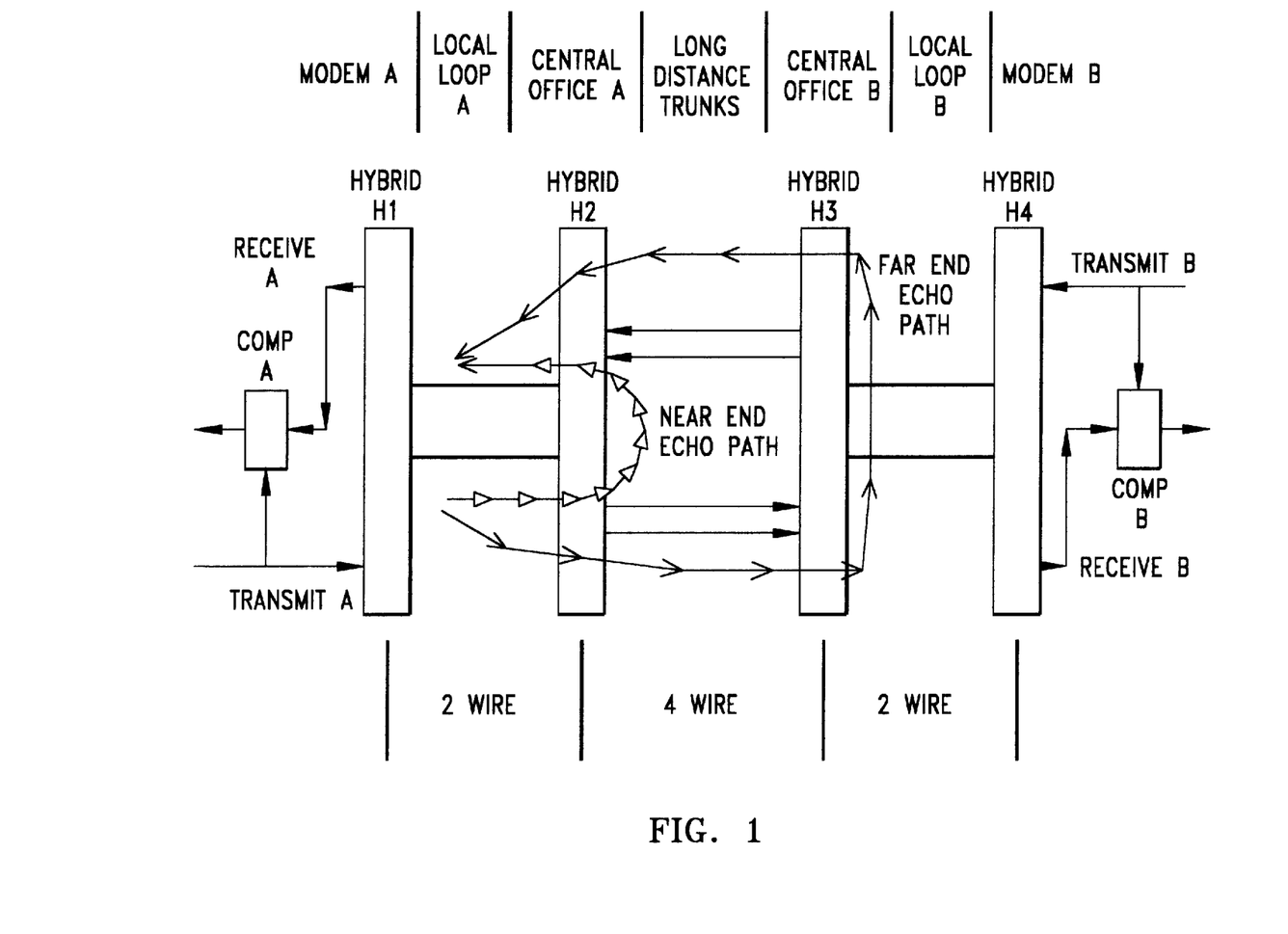

FIG. 1 illustrates standard relevant portions of the path that a telephone connection over the Public Switched Telephone Network transverses. Modem (or instrument) A is connected by a two-wire local loop to Central Office A. Between Modem A and Central Office A signals travel in both directions over the same two wires to Central Office A, which contains a two-wire to four-wire conversion device called a "hybrid" and shown at Hybrid H2. Central Office A is connected to Central Office B by a four wire "long distance" trunk and switching plant. In a four wire system, signals flow in one direction on one pair of wires and in the other direction on the other pair of wires. Central Office B similarly has a hybrid labeled Hybrid H3, and a two-wire local loop connection to Modem (or instrument) B. The drawing also illustrates the path transversed by the "Near End Echo" and the "Far End Echo". These echoes are primary items which must be sensed during the "training" periods to allow correct operation of high speed digital modems (such as those implementing the V.32 standard and higher), although there can be many other imperfections on the lines which must be sensed and compensated for as well. Modems labeled A and B also internally contain hybrids H1 and H4.

These echoes arise primarily because of variations in the impedance of the local loops from their nominal 600 ohm value. Any variation from this nominal, "unbalances" the hybrid, which is essentially a balancing circuit, and introduces the echo.

The present invention provides a means by which impairments, exemplified by these echoes, may be sensed and ultimately compensated for without the need for a three to ten second exclusive training period during which no other information can be communicated, as is required by conventional methods, as before explained.

Figure 4:
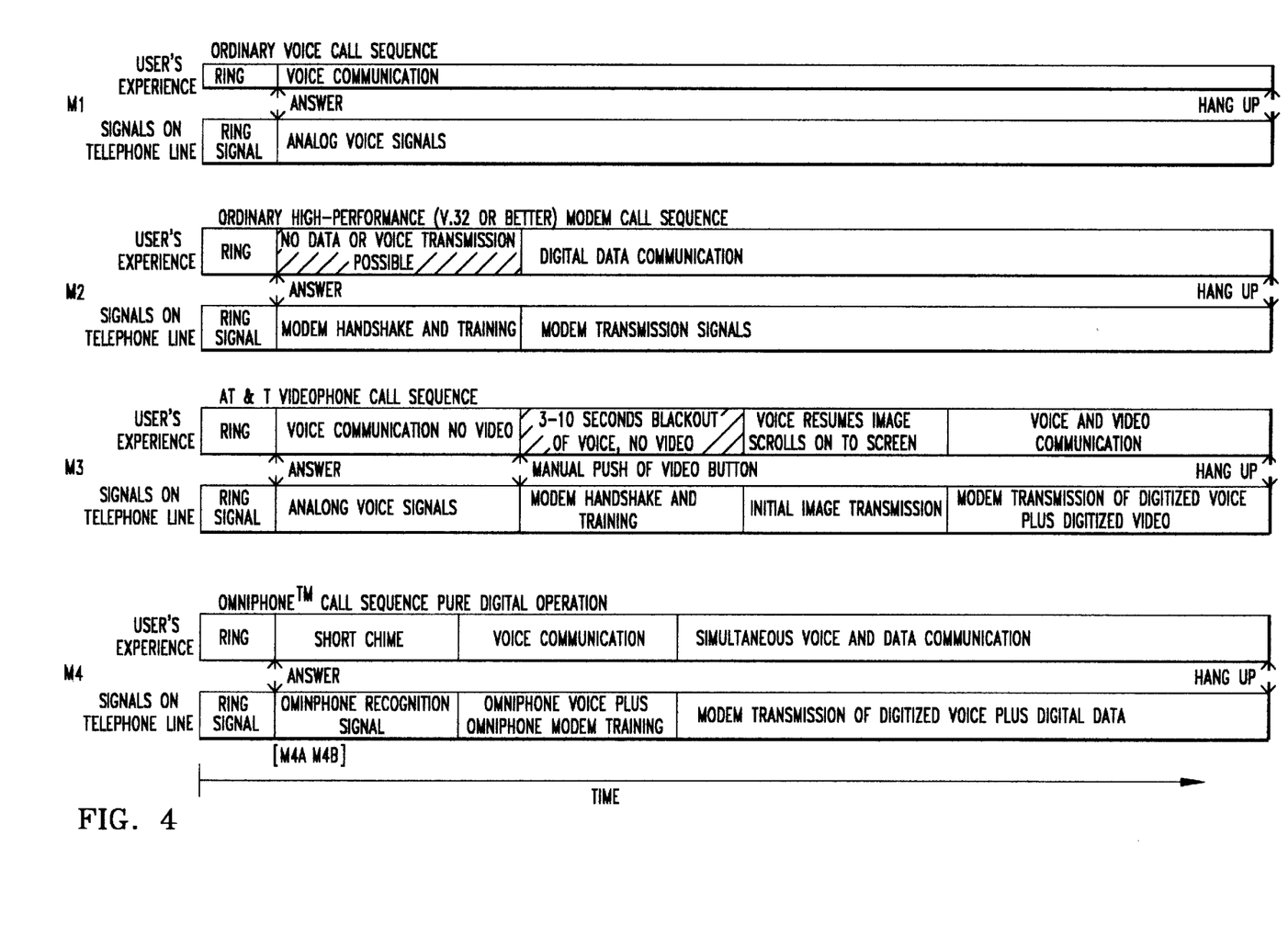
FIG. 4 is a functional time line diagram for several alternative applications, M1–M4.

In FIG. 4, the time line is illustrated of relevant events as perceived by the user and as seen on the physical telephone line in various modes of operation.

M1 represents ordinary telephone calls, for reference, where the calling ring is considered and voice communication proceeds, for example, until hang-up.

M2 shows conventional high speed modems, illustrating the modem handshake and training period, so-labeled, that occurs after the ring is answered. Data only begins to flow after this three to ten second interval.

M3 shows the sequence of events which occurs in the AT&T Videophone, as an example. The call is answered and ordinary communication occurs, but there is no video transmission. At some point, however, the users each manually push a "video button". This initiates the modem handshake and training period of three to ten seconds, during which a "Standby" message is displayed for the users. No user voice or video communication is possible during this time. After the training is completed, an initial image is transmitted, after which, digitally based voice and video communication proceeds.

Figure 6A:
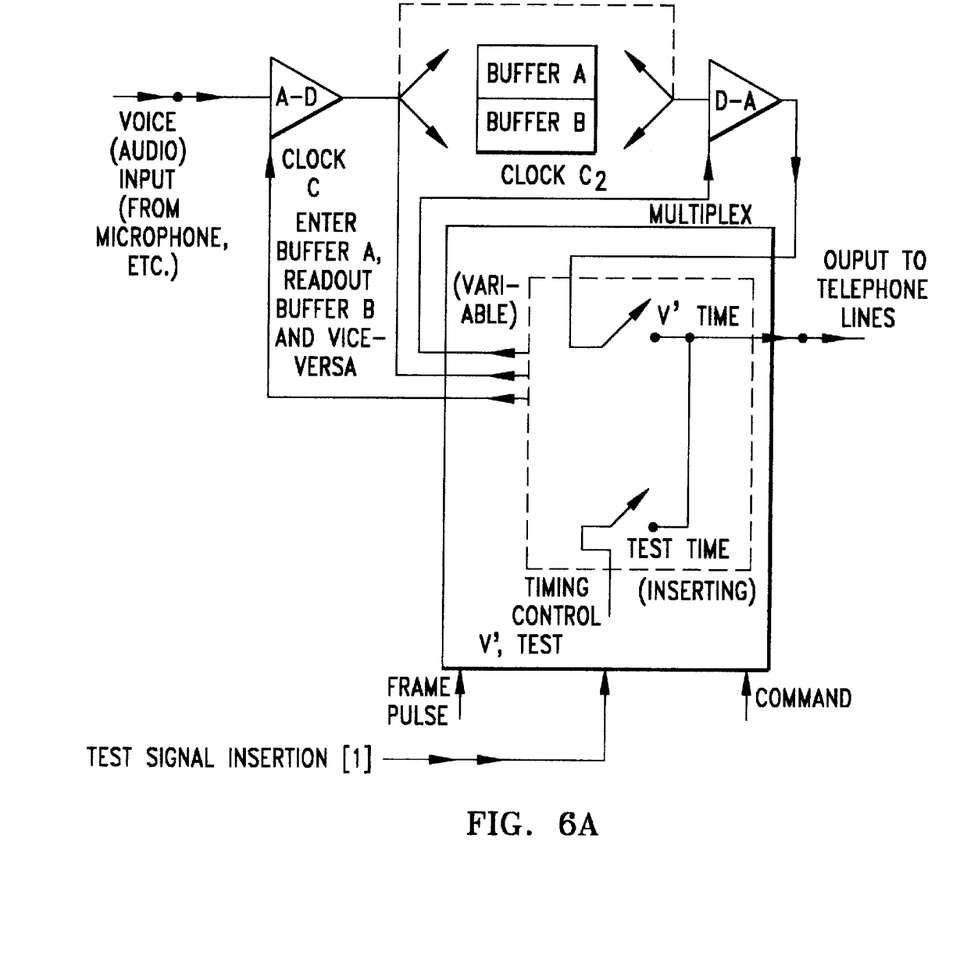
FIGS. 6A and 6B are respective block diagrams of an illustrative transmitting and receiving implementation for carrying out the application of FIG. 5.
Figure 6B:
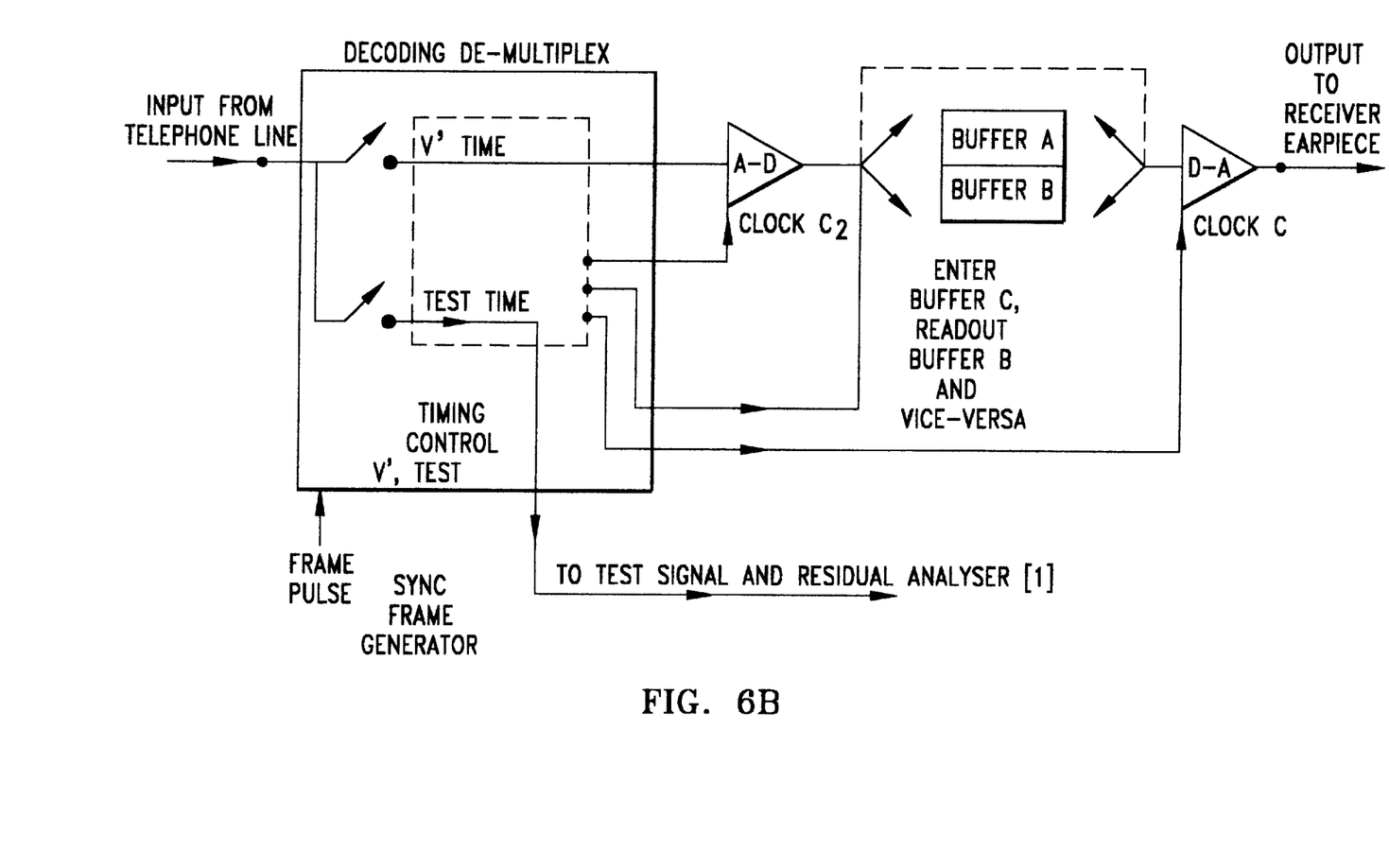

M4, however, shows the sequence of events in accordance with the present invention. Just after the answer, a special recognition signal, labeled "short chime" or special "bong", is transmitted and recognized in accordance with the method of my earlier before referenced U.S. Pat. No. 5,036,513. This triggers immediate coded voice communication as per the method of my other referenced U.S. Pat. No. 5,136,586; so the users are able to talk immediately. Simultaneously, moreover, the method of U.S. Pat. No. 5,136,586 creates additional time on the line between successive time frames (called unoccupied time intervals, room, or space), which, in that disclosure, was illustrated as being used for the transmission of digital data. In accordance with the present invention, instead, as more particularly discussed in connection with FIG. 6, that unoccupied time interval or room is employed for the transmission and reception of various test signals (including silence) which enable the system to sense the "impairments" (mainly distortions, delays and echoes as before discussed) present on the particular channel which is in use. This is the function normally provided by the "modem training and handshaking" boxes in the previous digitally based modes of the prior art. After sufficient information has been obtained, the system transitions into a purely digital mode. The only user apparent consequence of this is that it becomes possible for digital data as well as voice, to be communicated over the connection.

Figure 5:
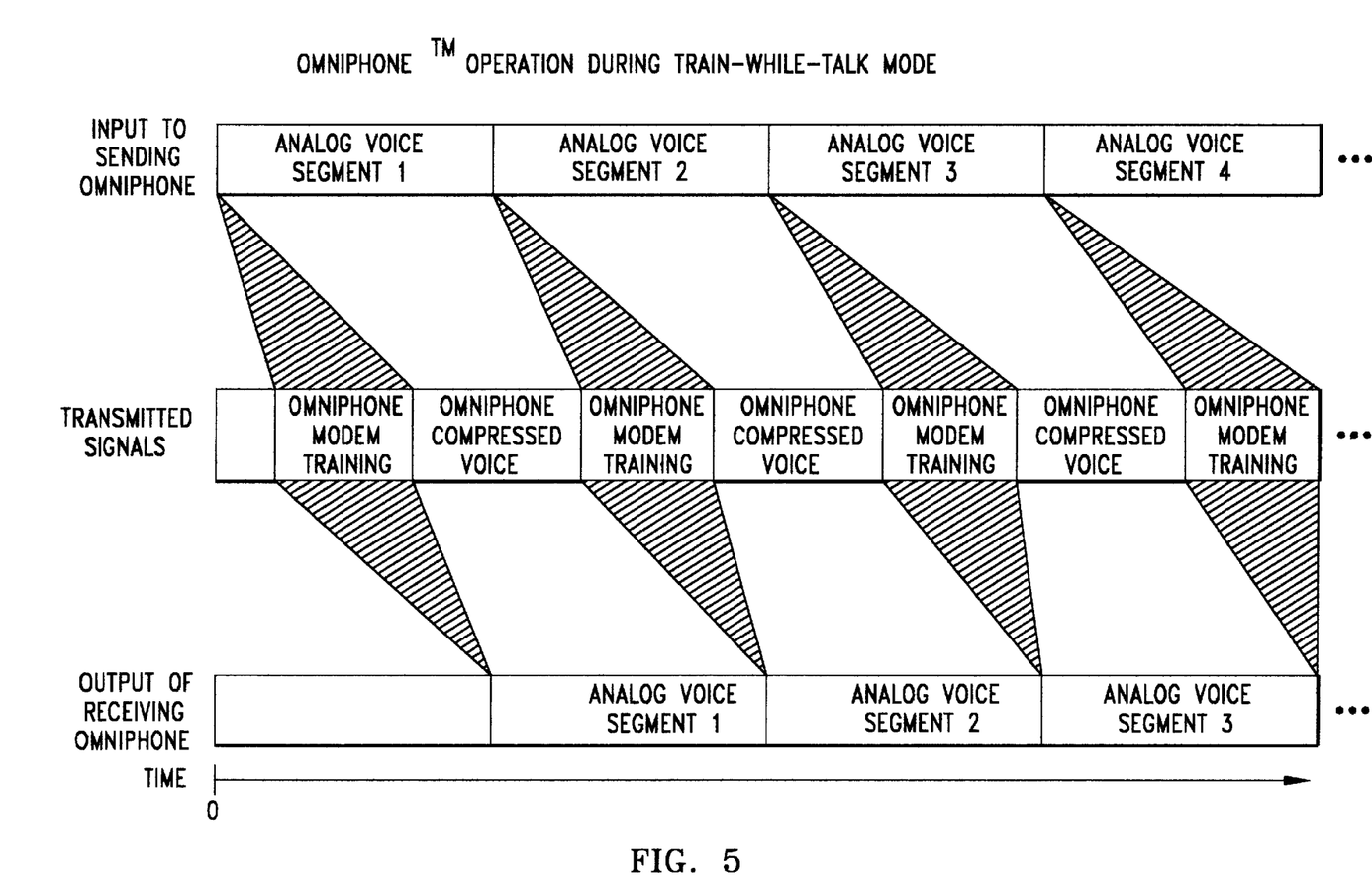
FIG. 5 is a similar diagram as applied to the preferred, though not exclusive, voice compression application of the train-while-talk mode of the invention.

The use of such unoccupied time intervals or room thus created on the line, employed herein for modem training, is illustrated in the timing diagram of FIG. 5. In practice, the "compressed voice" would typically represent about 80% of the time of each successive time frame, with the "modem training" occupying the remaining 20%. This has been found experimentally to yield good quality audio fidelity for the audio conversation. One point to note is that the guard bands, mentioned above as used in U.S. Pat. No. 5,136,586, are not required in this application, since user-variable information is not being transmitted during the unoccupied time or room intervals. Thus, they are simply deleted.

It now remains to describe in exemplary fashion, the details of a preferred way to implement such modem training or train-while-talk operation into the preferred type of system of my earlier U.S. Pat. No. 5,136,586, for the illustrative line echo imperfections.

Referring to FIG. 6A, the type of technique for providing in the successive time frames the unoccupied time interval, room, or space for the insertion of data involves compressing the voice data in the first part of each frame interval, as in a manner similar to that described in my before-described U.S. Pat. 5,136,586. Briefly, as previously summarized, that technique involves dividing the audio data into successive frames (flipping between Buffers A and B, as more fully described in said Patent), with the data in each frame then "played back" a certain amount faster than real time (D-A controlled by faster Clock C2). The resulting unoccupied time interval, room, space, or gap of line time thus formed in each frame interval may then be used to transmit other signals, such as modem-encoded digital data (here, the Test Signal Insertion). At the receiving instrument end, FIG. 6B, the voice portion of each frame is played back a corresponding amount slower than real time, thus filling in the gaps (playing back under Clock C after filling Buffers A and B under Clock C2, as described in said Patent). Experimentally, as before stated, it is found that 20% unoccupied time or room can readily be created with little loss of audio quality.

In designing and analyzing a modem training procedure, one employs two related classical assumptions, which are in practice satisfied to a high degree of precision at least during the time the training itself is taking place. First, one assumes the unknown transfer function represented by the channel is "stationary", or does not vary as a function of time. Second, one assumes the "superposition" principle; i.e. that "the response of the sum is equal to the sum of the responses".

Superposition is a general property of linear systems. The complication, of course, in applying these assumptions directly is that the channel has significant "memory". In the case of a long distance telephone trunk, due to delays and reflections, such memory can extend to a large fraction of a second.

In the present application, known test signals or signal conditions are transmitted at [1] in FIG. 6A, during the line time represented by the room or space created by the before-mentioned framing and shifting technique, such that the signals received in FIG. 6B during such "room" intervals provide evidence about the existing telephone channel or line transfer function. The situation, however, is more complicated than with conventional digital modem training because "uncontrolled" signals (i.e. the user's ongoing conversation) are also being sent over the line in close time proximity to the test signals. The uncontrolled signals could become confused with the test signals by the unknown channel transfer function. These uncontrolled signals, moreover, consist of two components; the local user's outbound conversation, which represents a known signal from the point of view of the local station, and the distant user's inbound conversation, the original form of which is unknown to the local station.

This complication can be approached by a model in combination with an iterative relaxation algorithm. Corresponding to each item in FIG. 1, a transfer function is introduced; for example, a near end local loop transfer function, a near end hybrid reflection transfer function, a four wire trunk delay, a far end hybrid reflection transfer function, and so on. Similar models are frequently employed by sophisticated telephone line equalizers. The purpose of the following discussion is to show how the problems introduced by the partially uncontrolled signal (the user's ongoing conversation) can be attacked.

Figure 3:
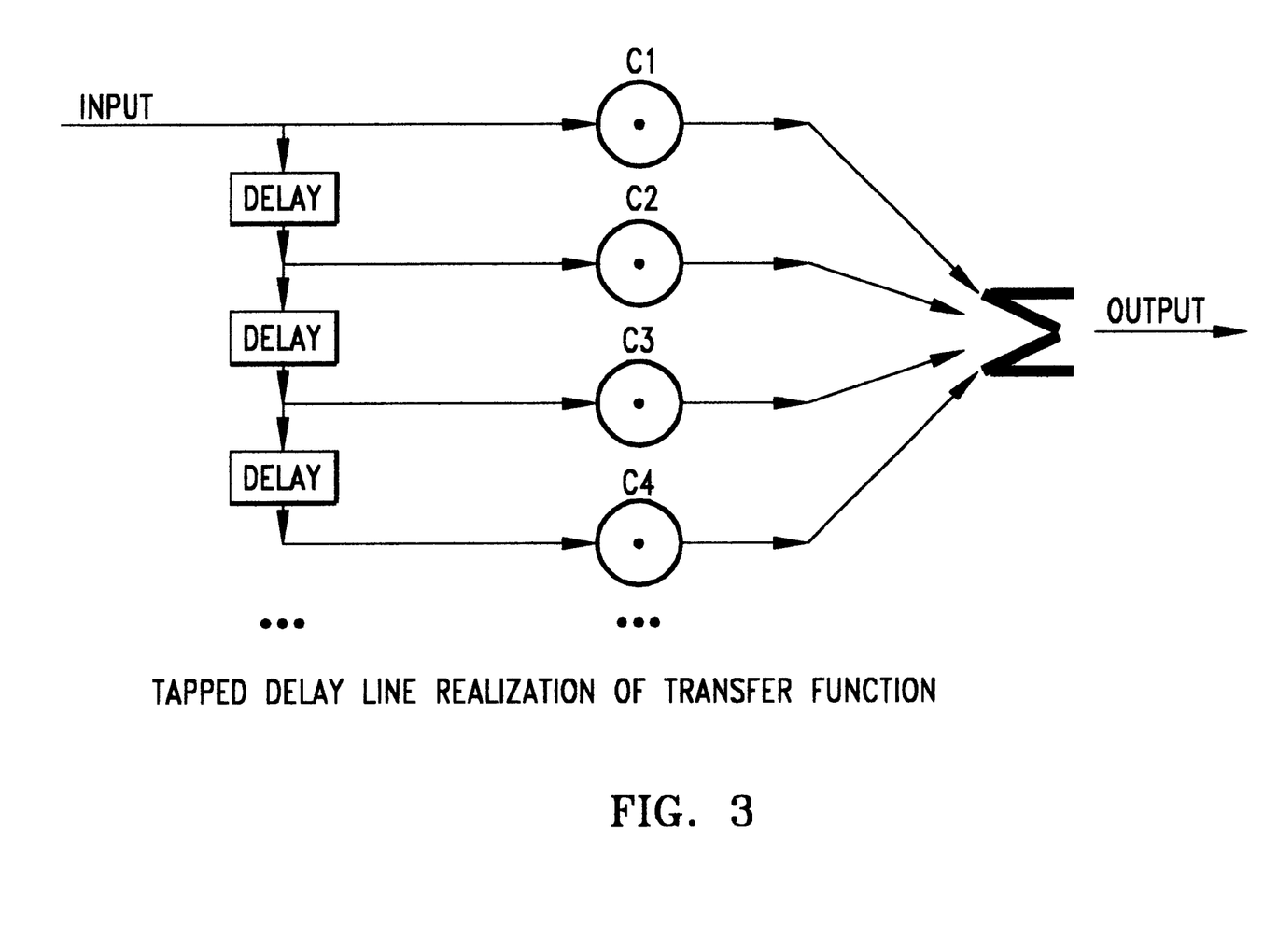
FIG. 3 illustrates a generic tapped delay line realization of an arbitrary transfer function, such as those shown in FIG. 2.

Any transfer function, such as Ti, in particular each of those referred to in the previous paragraph, can be represented as a tapped delay line D—D, FIG. 3, the taps T1, T2, T3 of which are summed at E, with coefficients C1, C2, C3 representing the impulse response of the transfer function Ti. Such delay lines are described, for example, in Oppenheim, Alan V. and Ronald W. Schafer, Digital Signal Processing, Prentice Hall, Inc., N.J., © 1975.

Figure 2:
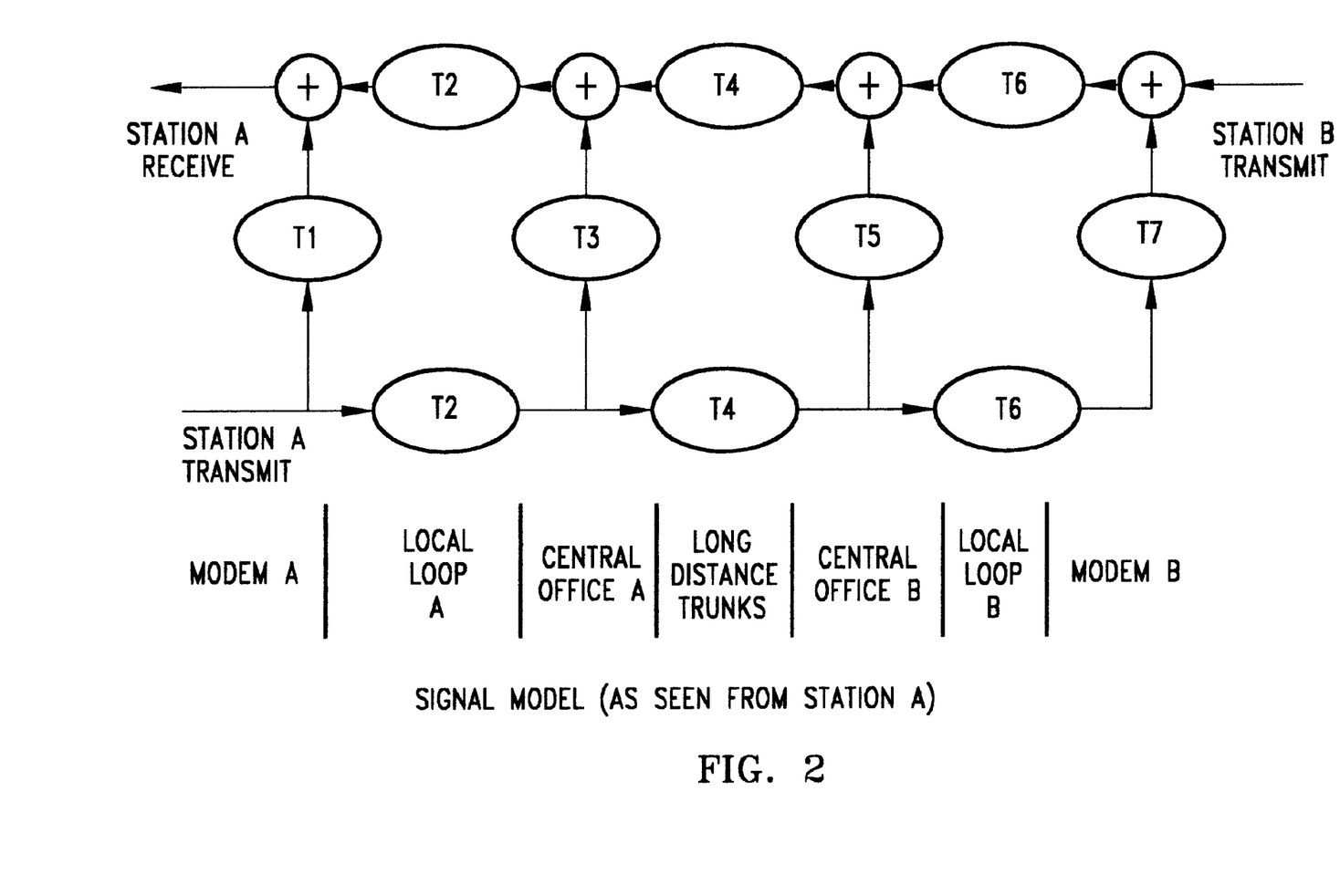
FIG. 2 is a more detailed version of FIG. 1 illustrating the transfer functions which are encountered by signals of interest. This figure serves as the basis for the model used in the later discussion of convergence of the modem compensator.

Initially, all these parameters in the model are set to typical values, or values based on the best evidence available. As various evidence from monitoring at the receiving instrument, FIG. 6B, becomes available about the response characteristics of the actual channel, the various unknown parameters, as illustrated in FIG. 2, can be respectively adjusted or converged, either one at a time or by various algorithms, to minimize the "residuals"; i.e. the difference between signal as predicted by the model and the observed signal, especially during the room interval when input is known at both ends of the connection. In this model, corresponding to FIG. 1, a transfer function is introduced at points T1–T6 between the stations A and B, each of which may, for example, be represented by a tapped delay line illustration of FIG. 3.

T1, in the FIG. 2 model corresponding to FIG. 1, corresponds to reflections integral to the instrument A, primarily in its hybrid; T2, the local loop Station A to Central Office A; T3, the hybrid of Central Office A; T4, the long distance 4-wire plant; T5, the hybrid of Central Office B; T6, the local loop Central Office B to Station B; and T7, the hybrid of Station B.

The impairment path segments having corresponding transfer functions provides a generalized overall model, the successive loop converging starting with the nearest possible reflection (hybrid H1), and then converging hybrid H2 and its local loop, and so on, to the last hybrid H4. The amount of computation involved is reduced by having the convergence proceed by such stages. When a sufficient degree of convergence is obtained, the process would move on to the next stage.

Figure 7:
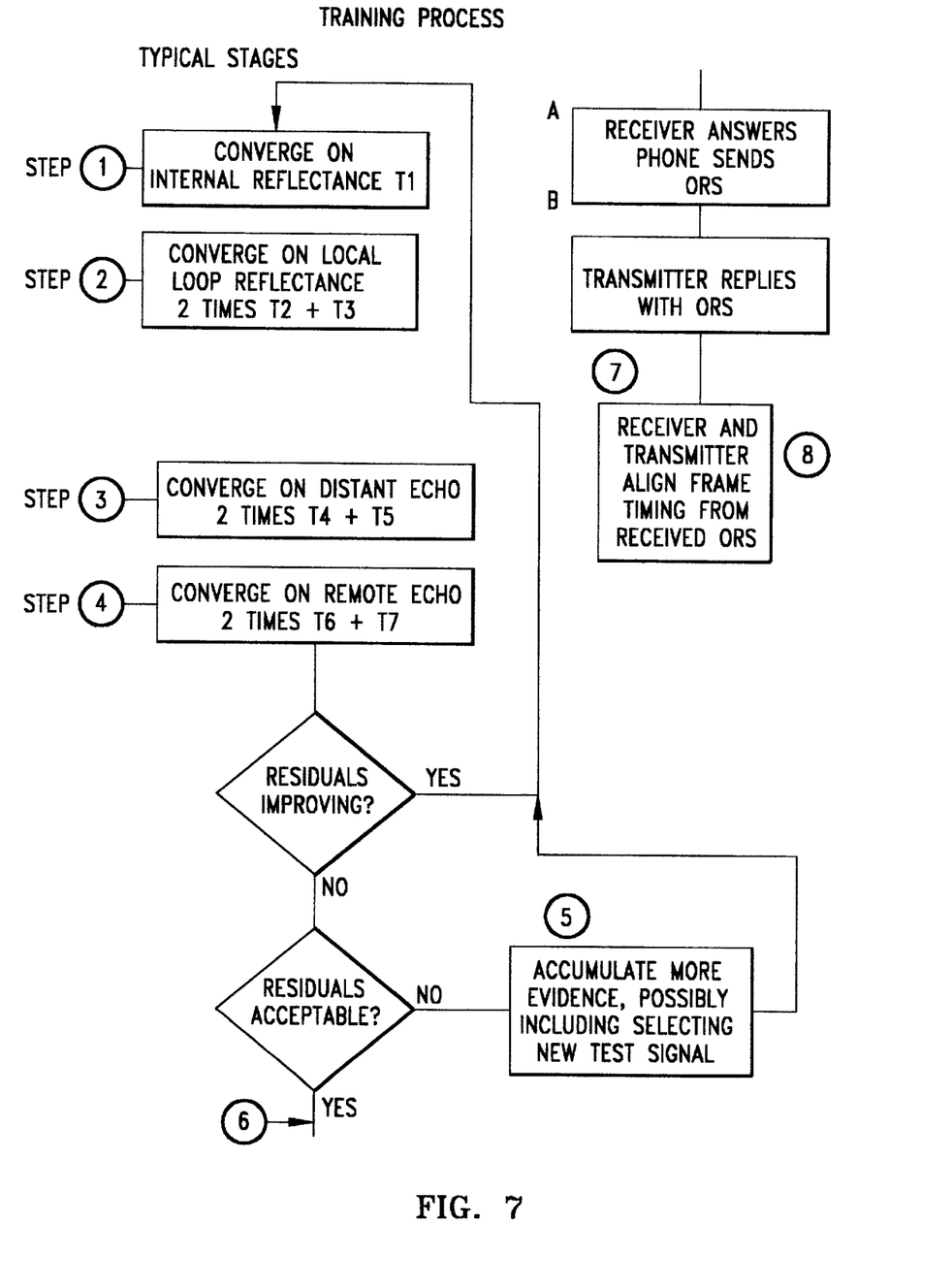
FIG. 7 illustrates typical stages in the convergence process whereby combinations of the variables previously identified are sequentially adjusted to improve and test the model.
Figure 8:
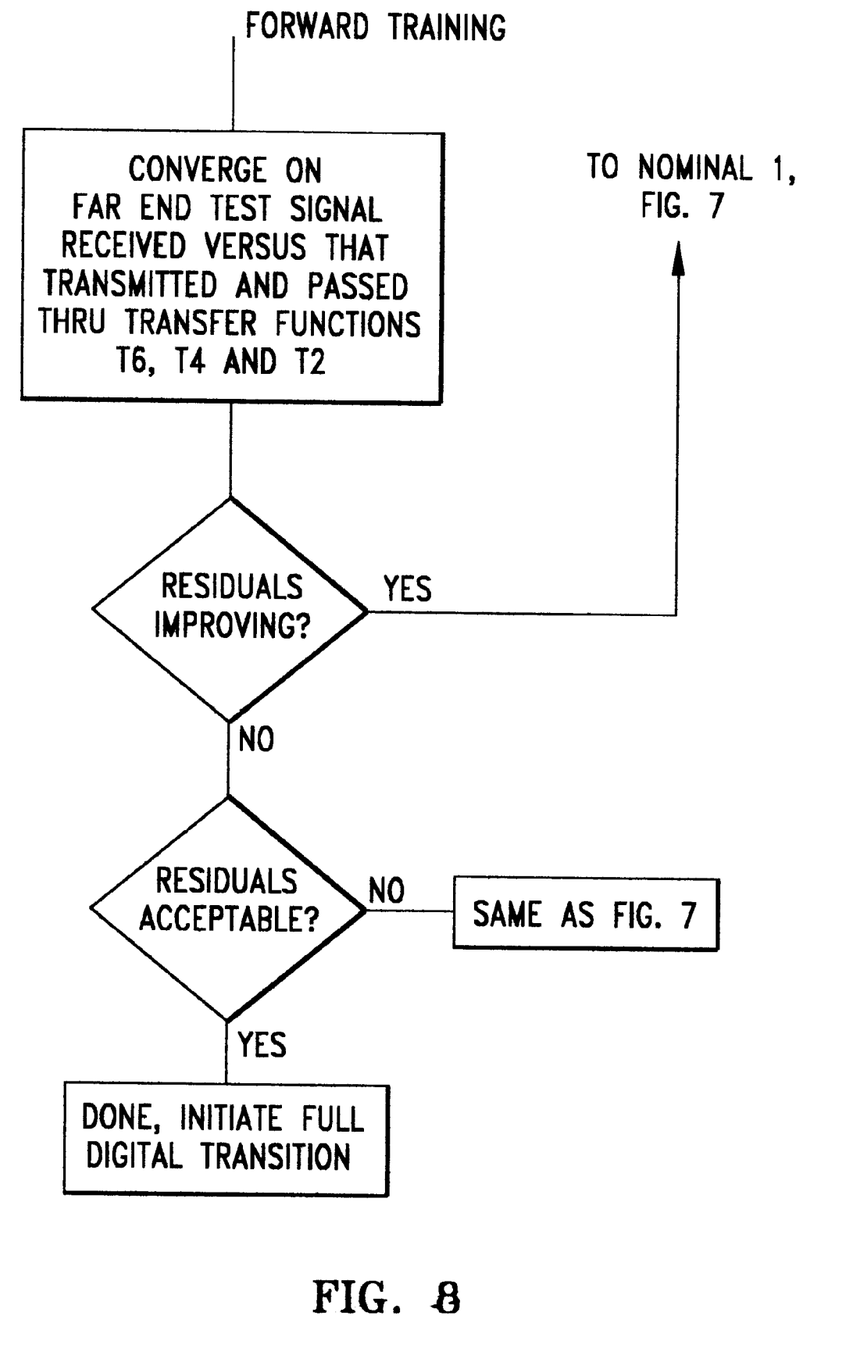
FIG. 8 is a continuation and extension of the procedures shown in FIG. 7.

This process thus involves several stages (Stages 1–4) at each end of the connection, as shown in FIG. 7. First, the reflective transfer functions (near and far end) are determined at Stage 1. The fact that the entire locally transmitted signal is known aids in convergence during this step. The local loop plus Cental Office A reflection is determined at Stage 2. The long distance plant plus Central Office B reflection is determined at Stage 3. The remote local loop plus Station B reflection is determined at Stage 4. The overall scheme includes means to notify each end if a new test signal is selected at [5] and when overall convergence is achieved at [6].

The following is a more detailed sketch, illustrated in FIG. 4, part M4, of an example of how matters can proceed:

(1) The called or receiving station transmits an "Omniphone"™ recognition signal (ORS) two seconds after picking up the line. This delay is mandated by regulation to allow certain phone company billing systems to function. This signal appears as a distinctive "bong" or "chime" to the user, as per the method of my U.S. Pat. No. 5,036,513.

(2) The calling or transmitting station, detecting the ORS, replies with a recognition signal at [FIG. 4, part M4 - B]. Both stations retain the full waveform of these signals, since they contain information about the transfer functions of the channel. There is not as yet, however, sufficient evidence fully to train a digital modem, because the recognition signals may very well be shorter than the channel delay, among other reasons. That is, it is quite possible that there are still some important "echoes" bouncing around in the system which have, as yet, had no effect on the received recognition signal.

(3) Both stations begin operation as per the method of my U.S. Pat. No. 5,136,586, as in FIGS. 6A and 6B, so that the users may immediately begin their conversation. Some details of the method, however, might well be altered for this application.

A separate signal for location of the frames, which was the function of the guard bands in U.S. Pat. No. 5,136,586 is no longer required, as before explained. This is because the initial frame reference is accurately supplied by the recognition signal in this application and the entire training mode of operation, during which errors in frame location have a chance to accumulate, is relatively short. Also, since the "data" is nearly always all zero there is no need for a separator between the two signals.

Instead, any slight variation in timing between the stations can be tracked by "centering" the data interval in the received window having minimum energy as shown at 7 in FIG. 7. This can be done as part of the channel model; thus, the line characteristic, such as it is known, aids in the process.

(4) Both ends adjust their channel models at (Stages 1 and 6 in FIG. 7) to minimize energy in the received "data" interval. If the line is perfectly compensated, of course, the received data signal should equal the transmitted data signal, which would be, for example, zero during this interval. As noted above, the first stage is to compensate for echo reflections of the locally transmitted signal into the locally received signal. These, in turn, occur mainly at the hybrids HI and H2, FIG. 1, which are present at each end of each local loop, as before described. Since the hybrids function on an impedance balancing principle, any mismatch between the actual line impedance and that assumed by the hybrid will cause the echo reflection as earlier discussed.

In due course, the algorithm introduced in FIG. 7 will converge so that there is no remaining component of the locally transmitted signal observed in the test interval of the received signal. A residual measure could be used or a fixed time interval allowed. The system is then ready to advance forward to the training stage. The recognition signal originally received might well be reexamined at this time, as at 8 in FIG. 7, to provide the initial state of the portion of the model modeling the forward characteristics of the channel.

If a variable time is allowed for the reflected training stage, the beginning of the reflected training stage could be signaled by a brief burst during the test interval.

During the forward training stage, known signals are sent at [1] in FIG. 6A, during the test interval, and the responses in reality and through the model compared at [1] in FIG. 6B. A complication, before discussed, is that an "unknown" signal (i.e. the user conversation) is also being sent in close proximity, so that interference may occur. However, such interference may be estimated by deconvolving the signal which has been received with the model which has been constructed. The remaining parameters are "hill climbed" repetitively to bring the modeled response as close as possible to the observed response.

A compensator COMP A in FIG. 1, comparing what was transmitted at Transmit A and what has been received at Receive A in the training exercise, then adjusts the modem correctively.

Another technique which could be employed at this stage would be to utilize the method of U.S. Pat. No. 5,136,586 to transmit a digitized version of the actual transmitted signal for an earlier period of time. This could be done using a slower and more robust modem technology which would not be affected by the as then unknown imperfections in the channel. Once the exact signals which had been sent and received at both ends were available, it would be a relatively simple matter to determine the various line transfer functions.

There might be other low volume digital information which it might be desirable to send at this stage in some applications. For example, configuration information as to which protocols were supported might be valuable.

The final transfer into the pure digital mode could then be signaled in the test channel at [1], FIG. 6A, or could occur after a fixed time, as desired. As noted previously, the user, who has been talking all the time that this training has been going on, would not even notice the switchover except that auxiliary digital data would start to flow.

Further modifications will occur to those skilled in this art, such being considered to fall within the spirit and scope of the invention as defined in the appended claims.

What is claimed is:

1. A method of training high speed digital telephonic modems, operating with telephone transmitting and receiving instruments over a telephone channel, to become appropriately adjusted to obviate imperfections and to do so concurrently with uninterrupted analog voice communication over the telephone channel, said method comprising, creating successive time frames; time compressing voice signals emanating at the instruments within the successive time frames thereby leaving an unoccupied time interval within each such frame; introducing into said unoccupied times, within each time frame, digital data for training the modems to adjust for such imperfections; and adjusting modems in response to and in accordance with said digital data during uninterrupted analog voice communication thereover, and in which the transmitting instrument sends a special protocol recognition signal along the channel indicating it is equipped for concurrent analog voice and digital data transmission, and the receiving instrument, also so equipped, responds along the channel with recognition acknowledgement that the receiving instrument is also so equipped, and in which said digital data is obtained by introducing test signals or conditions and monitoring their reception to sense therefrom the presence of the imperfections in the channel.

2. A method as claimed in claim 1 and in which said digital data is determined by sending modeled hypothetical signals as to the suspected imperfections, with successive converging corrections effected in successive time frames in response to analyzing the received signals.

3. A method of training high speed digital telephonic modems, operating with telephone transmitting and receiving instruments over a telephone channel, appropriately adjusted to obviate imperfections and to do so concurrently with uninterrupted analog voice communication over the telephone channel, said method comprising, creating successive time frames; time compressing analog voice signals emanating at the instruments within the successive time frames thereby leaving an unoccupied time interval within each such frame; introducing into said unoccupied times, within each time frame, digital data for training the modems to adjust for such imperfections; and adjusting the modems in response to and in accordance with said digital data during uninterrupted voice communication thereover; and in which said digital data is determined by sending modeled hypothetical signals as to the suspected imperfections, with successive converging corrections effected in successive time frames in response to analyzing the received signals; and in which the model initially is based on previously known or suspected values of near and far end channel reflections, delay, and forward and reverse transfer functions along the channel; and such values are successively convergingly changed as the responses at the receiving instrument provide corrective information.

4. A method as claimed in claim 1 and in which the unoccupied time intervals are adjusted to be of the order of about 20% of the time frames.

5. A method of training high speed digital telephonic modems as claimed in claim 2 and in which the voice data is compressed at the transmitting instrument by recording the voice data in each frame faster than in real time; and at the receiving instrument, each frame is played back a corresponding amount slower than real time.

6. A method of training high speed digital telephonic modems, operating with telephone transmitting and receiving instruments over a telephone channel, to become appropriately adjusted to obviate imperfections, and to do so concurrently with uninterrupted analog voice communication over the telephone channel, said method time comprising, creating successive time frames; compressing analog voice signals emanating at the instruments within the successive time frames thereby leaving an unoccupied time interval within each such frame; introducing into said unoccupied times, within each time frame, digital data for training the modems to adjust for such imperfections; and adjusting the modems in response to and in accordance with said digital data during uninterrupted analog voice communication thereover; and in which the transmitting instrument sends a special protocol recognition signal along the channel indicating it is equipped for concurrent digital voice and data transmission, and the receiving instrument, also so equipped, responds along the channel with recognition acknowledgment that the receiving instrument is also so equipped.

7. Apparatus for telephonically, over a telephone channel, transmitting and receiving between high speed digital data-equipped telephone instruments, concurrent analog voice signals and digital training data for adjusting modems to obviate imperfections, said apparatus having, in combination with the telephone instruments and modems connected to the telephone channel, successive time frame generating means; means for time compressing analog voice signals emanating at the instruments within successive time frames, thereby leaving an unoccupied time interval within each such frame; means for determining information for training the modems to adjust for such imperfections; means for converting said information into digital data; means for introducing said digital data into the unoccupied times within each time frame; and means for adjusting the modems in response to and in accordance with said digital data to correct for the imperfections in the telephone channel, and during uninterrupted voice analog communication thereover, and in which means is provided at the transmitting instrument to send a special protocol reception signal along the channel indicating it is equipped for concurrent analog voice and data transmission, and the receiving instrument is also so equipped to respond along the channel with recognition acknowledgement that the receiving instrument is also so equipped, and in which the determining means comprises means for introducing test signals or conditions and means for monitoring their reception to sense therefrom the presence of the imperfections in the channel.

8. Apparatus for telephonically, over a telephone channel, transmitting and receiving between high speed digital data-equipped telephone instruments, concurrent analog voice signals and digital training data for adjusting modems to obviate imperfection, said apparatus having, in combination with the telephone instruments and modems connected to the telephone channel, successive time frame generating means; means for time compressing analog voice signals emanating at the instruments within successive time frames, thereby leaving an unoccupied time interval within each such frame; means for determining information for training the modems to adjust for such imperfections; means for converting said information into digital data; means for introducing said digital data into the unoccupied times within each time frame; and means for adjusting the modems in response to and in accordance with said digital data to correct for the imperfections in the telephone channel, and during uninterrupted analog voice communication thereover, and in which means is provided at the transmitting instrument to send a special protocol reception signal along the channel indicating it is equipped for concurrent analog voice and data transmission, and the receiving instrument is also so equipped to respond along the channel with recognition acknowledgement that the receiving instrument is also so equipped, and in which the determining means comprises means for transmitting model hypothetical signals as to the suspected imperfections, and means for effecting successive converging connections thereof in successive time frames in response to analysis of the received signals.

9. Apparatus for telephonically, over a telephone channel, transmitting and receiving between high speed digital data-equipped telephone instruments, concurrent analog voice signals and digital training data for adjusting modems to obviate imperfections, said apparatus having, in combination with the telephone instruments and modems connected to the telephone channel, successive time frame generating means; means for time compressing analog voice signals emanating at the instruments within successive time frames, thereby leaving an unoccupied time interval within each such frame; means for determining information for training the modems to adjust for such imperfections; means for converting said information into digital data; means for introducing said digital data into the unoccupied times within each time frame; and means for adjusting the modems in response to and in accordance with said digital data and during uninterrupted analog voice communication thereover; and in which the determining means comprises means for transmitting model hypothetical signals as to the suspected imperfections, and means for effecting successive converging connections thereof in successive time frames in response to analysis of the received signals; and in which said model is initially based on previously known or suspected values of near and far end channel reflections, delay, and forward and reverse transfer functions along the channel; and means is provided for successively convergingly changing such values as the responses at the receiving instrument provide corrective information.

10. Apparatus as claimed in claim 9 and in which the convergingly changing means comprises a finite impulse response filter having successive delay line compensation means.

11. Apparatus for telephonically, over a telephone channel, transmitting and receiving between high speed digital data-equipped telephone instruments, concurrent analog voice signals and digital training data for adjusting modems to obviate imperfections, said apparatus having, in combination with the telephone instruments and modems connected to the telephone channel, successive time frame generating means; means for time compressing analog voice signals emanating at the instruments within successive time frames, thereby leaving an unoccupied time interval within each such frame; means for determining information for training the modems to adjust for such imperfections; means for converting said information into digital data; means for introducing said digital data into the unoccupied times within each time frame; and means for adjusting the modems in response to and in accordance with said digital data to correct for the imperfections in the telephone channel, and during uninterrupted voice communication thereover; and in which means is provided at the transmitting instrument to send a special protocol reception signal along the channel indicating it is equipped for concurrent digital voice and data transmission, and the receiving instrument is also so equipped to respond along the channel with recognition acknowledgment that the receiving instrument is also so equipped.

12. A method of training high speed digital telephonic modems, that comprises operating with telephone transmitting and receiving instruments over a telephone channel, concurrently with uninterrupted analog voice communication over the telephone channels, creating successive time frames; time compressing analog voice signals emanating at the instruments within the successive time frames thereby leaving an unoccupied time interval within each such frame; and inputting into said unoccupied times, within each time frame, digital training and protocol data for adjusting the modems in accordance with said data.

13. Apparatus having in combination, means for telephonically, over a telephone channel, transmitting and receiving between high speed digital data-equipped telephone instruments, concurrent analog voice signals and digital training data for adjusting modems connected to the telephone channel; in combination with the telephone instruments and modems, successive time frame generating means; means for time compressing analog voice signals emanating at the instruments within successive time frames, thereby leaving an unoccupied time interval within each such frame; and means for inputting the digital training data into the unoccupied times within each time frame to adjust the modems in response to and in accordance with said digital training data.

14. The method of claim 1 wherein, prior to said adjusting of the modems, said imperfections in the telephone channel rendered the channel unsuitable for reliable digital data transmission, though intelligible and useable for analog voice communication.

* * * * *